United States Patent
Sung et al.

(10) Patent No.: US 9,581,234 B2
(45) Date of Patent: *Feb. 28, 2017

(54) LIQUID COOLED POWER INDUCTOR

(71) Applicant: FORD GLOBAL TECHNOLOGIES, LLC, Dearborn, MI (US)

(72) Inventors: Myung Ki Sung, Ypsilanti, MI (US); Edward Chan-Jiun Jih, Troy, MI (US); Michael W. Degner, Novi, MI (US); Shailesh Shrikant Kozarekar, Novi, MI (US); Behzad Vafakhah, Ann Arbor, MI (US); Shahram Zarei, Farmington Hills, MI (US); Brandon Dobbins, Grosse Pointe Shores, MI (US); Vincent Skalski, Plymouth, MI (US); Brian Richard Light, Flat Rock, MI (US); Sudhir Kumar, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 473 days.

This patent is subject to a terminal disclaimer.

(21) Appl. No.: 14/193,274

(22) Filed: Feb. 28, 2014

(65) Prior Publication Data
US 2014/0175867 A1 Jun. 26, 2014

Related U.S. Application Data (63) Continuation-in-part of application No. 13/673,731, filed on Nov. 9, 2012, now Pat. No. 9,543,069, and a
(Continued)

(51) Int. Cl.
*F16H 57/04* (2010.01)
*B60L 11/18* (2006.01)
(Continued)

(52) U.S. Cl.
CPC ...... *F16H 57/0412* (2013.01); *B60L 11/1803* (2013.01); *H01F 27/025* (2013.01);
(Continued)

(58) Field of Classification Search
CPC .................................................... H01F 27/12
(Continued)

(56) References Cited

U.S. PATENT DOCUMENTS 1,579,049 A 3/1926 Ainsworth
2,608,610 A 8/1952 Thulin
(Continued)

FOREIGN PATENT DOCUMENTS

CA 1210464 A1 8/1986
CA 2781203 A1 5/2011
(Continued)

OTHER PUBLICATIONS

Salem et al., Power Module Cooling for Future Electric Vehicle Applications: A Coolant Comparison of Oil and PGW, US Naval Academy, Annapolis, MD (2006) pp. 1-4.
(Continued)

*Primary Examiner* — Robert Deberadinis
(74) *Attorney, Agent, or Firm* — David B. Kelley; Brooks Kushman P.C.

(57) ABSTRACT

A vehicle electrical power system includes a variable voltage converter. The variable voltage converter includes an inductor assembly having a housing that defines a chamber containing dielectric fluid. An inductor is disposed within the chamber and is in contact with the fluid. The power system also includes a pump configured to circulate the dielectric fluid to cool the inductor.

19 Claims, 8 Drawing Sheets

Related U.S. Application Data continuation-in-part of application No. 13/834,416, filed on Mar. 15, 2013.

(51) Int. Cl.
*H01F 27/02* (2006.01)
*H01F 27/10* (2006.01)
H01F 27/12 (2006.01)
H01F 3/14 (2006.01)

(52) U.S. Cl.
CPC .............. *H01F 27/10* (2013.01); *H01F 3/14* (2013.01); *Y10S 903/902* (2013.01); *Y10T 74/2189* (2015.01)

(58) Field of Classification Search
USPC .......................................................... 307/9.1
See application file for complete search history.

(56) References Cited

U.S. PATENT DOCUMENTS

| | | | |
|---|---|---|---|
| 3,162,829 A | 12/1964 | Wildy et al. |
| 3,184,564 A | 5/1965 | Ryckman et al. |
| 3,195,086 A | 7/1965 | Taylor |
| 3,197,167 A | 7/1965 | Sturgis |
| 3,261,905 A | 7/1966 | Allen |
| 4,123,677 A | 10/1978 | Laskaris et al. |
| 4,150,278 A | 4/1979 | Resener |
| 4,282,567 A | 8/1981 | Voigt |
| 4,485,367 A | 11/1984 | Hashizume |
| 4,549,158 A | 10/1985 | Mitsui et al. |
| 4,577,175 A | 3/1986 | Burgher et al. |
| 4,581,477 A | 4/1986 | Harumoto et al. |
| 5,352,853 A | 10/1994 | Takagi |
| 6,384,703 B1 | 5/2002 | Ramos et al. |
| 6,392,519 B1 | 5/2002 | Ronning |
| 6,688,383 B1 | 2/2004 | Sommer et al. |
| 6,772,603 B2 | 8/2004 | Hsu et al. |
| 7,009,317 B2 | 3/2006 | Cronin et al. |
| 7,205,875 B2 | 4/2007 | Oughton, Jr. et al. |
| 7,212,406 B2 | 5/2007 | Kaishian et al. |
| 7,508,289 B1 | 3/2009 | Wernicki |
| 7,561,429 B2 | 7/2009 | Yahata et al. |
| 7,823,669 B2 | 11/2010 | Bandai et al. |
| 8,009,004 B2 | 8/2011 | Ahangar et al. |
| 8,201,650 B2 | 6/2012 | Yoshida |
| 8,215,003 B2 | 7/2012 | Saka et al. |
| 2003/0098769 A1 | 5/2003 | Cheung et al. |
| 2004/0032312 A1 | 2/2004 | Yu et al. |
| 2004/0045749 A1 | 3/2004 | Jaura et al. |
| 2004/0184292 A1 | 9/2004 | Knox |
| 2006/0103256 A1 | 5/2006 | Welke |
| 2007/0075812 A1 | 4/2007 | Su et al. |
| 2009/0108971 A1 | 4/2009 | Okamoto |
| 2010/0072865 A1 | 3/2010 | Endo et al. |
| 2010/0175933 A1 | 7/2010 | Yoshida |
| 2010/0245016 A1 | 9/2010 | Kameda et al. |
| 2011/0068506 A1 | 3/2011 | Kusawake et al. |
| 2011/0096496 A1 | 4/2011 | Doo et al. |
| 2011/0121935 A1 | 5/2011 | Chu et al. |
| 2011/0140820 A1 | 6/2011 | Guentert, III et al. |
| 2011/0241815 A1 | 10/2011 | Lu |
| 2011/0267161 A1 | 11/2011 | MacLennan et al. |
| 2012/0044647 A1 | 2/2012 | Lee et al. |
| 2012/0139684 A1 | 6/2012 | Kobayashi et al. |
| 2012/0194311 A1 | 8/2012 | Suzuki |
| 2012/0200382 A1 | 8/2012 | Hejny |
| 2013/0106556 A1 | 5/2013 | Suzuki et al. |
| 2013/0141201 A1 | 6/2013 | Chou |
| 2014/0132378 A1* | 5/2014 | Vafakhah ................ H01F 27/12 336/55 |

FOREIGN PATENT DOCUMENTS

| | | |
|---|---|---|
| DE | 202005001931 U1 | 5/2005 |
| DE | 102010043595 A1 | 5/2012 |
| FR | 2622064 A1 | 4/1989 |
| GB | 740572 | 11/1955 |
| JP | 55149430 A | 11/1980 |
| JP | 60210817 A | 10/1985 |
| JP | 05217748 A | 8/1993 |
| JP | 2003007547 | 1/2003 |
| JP | 2011062061 A | 3/2011 |
| JP | 2011122711 A | 6/2011 |
| JP | 2012169466 A | 9/2012 |
| WO | 2011132361 A1 | 10/2011 |
| WO | 2012107826 A1 | 8/2012 |
| WO | 2012153619 A1 | 11/2012 |
| WO | 2013001591 A1 | 1/2013 |

OTHER PUBLICATIONS

James, et al., DC-DC Converter for Hybrid and All Electric Vehicles, EVS24 International Battery, Hybrid and Fuel Cell Electric Vehicle Symposium, Stavanger, Norway (2009) pp. 1-9.

* cited by examiner

LIQUID COOLED POWER INDUCTOR

CROSS-REFERENCE TO RELATED APPLICATIONS

This application is a continuation-in-part of application Ser. No. 13/673,731, filed Nov. 9, 2012 and a continuation-in-part of application Ser. No. 13/834,416, filed Mar. 15, 2013, the disclosures of which are hereby incorporated in their entirety by reference herein.

TECHNICAL FIELD

This disclosure relates to an inductor assembly of a DC-DC converter, and components for thermal management of the inductor assembly.

BACKGROUND

The term "electric vehicle" as used herein, includes vehicles having an electric machine for vehicle propulsion, such as battery electric vehicles (BEV), hybrid electric vehicles (HEV), and plug-in hybrid electric vehicles (PHEV). A BEV includes an electric machine, wherein the energy source for the electric machine is a battery that is re-chargeable from an external electric grid. In a BEV, the battery is the source of energy for vehicle propulsion. A HEV includes an internal combustion engine and one or more electric machines, wherein the energy source for the engine is fuel and the energy source for the electric machine is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

Electric vehicles may include a voltage converter (DC-DC converter) connected between the battery and the electric machine. Electric vehicles that have AC electric machines also include an inverter connected between the DC-DC converter and each electric machine. A voltage converter increases ("boosts") or decreases ("bucks") the voltage potential to facilitate torque capability optimization. The DC-DC converter includes an inductor (or reactor) assembly, switches and diodes. A typical inductor assembly includes a conductive coil that is wound around a magnetic core. The inductor assembly generates heat as current flows through the coil.

SUMMARY

In one embodiment, a transmission includes a housing defining a chamber and an inductor assembly including a coil having exterior surface portions exposed to an interior of the chamber. At least one gear is disposed within the housing and is configured to rotate relative to the housing and splash fluid onto the exterior surface portions to cool the inductor assembly.

In another embodiment, a vehicle comprises a transmission including gears lubricated by transmission fluid and a variable voltage converter including an inductor arranged such that the transmission fluid contacts the inductor to cool the inductor.

In yet another embodiment, a vehicle electrical power system includes a variable voltage converter. The variable voltage converter includes an inductor assembly having a housing that defines a chamber containing dielectric fluid. An inductor is disposed within the chamber and is in contact with the fluid. The power system also includes a pump configured to circulate the dielectric fluid to cool the inductor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
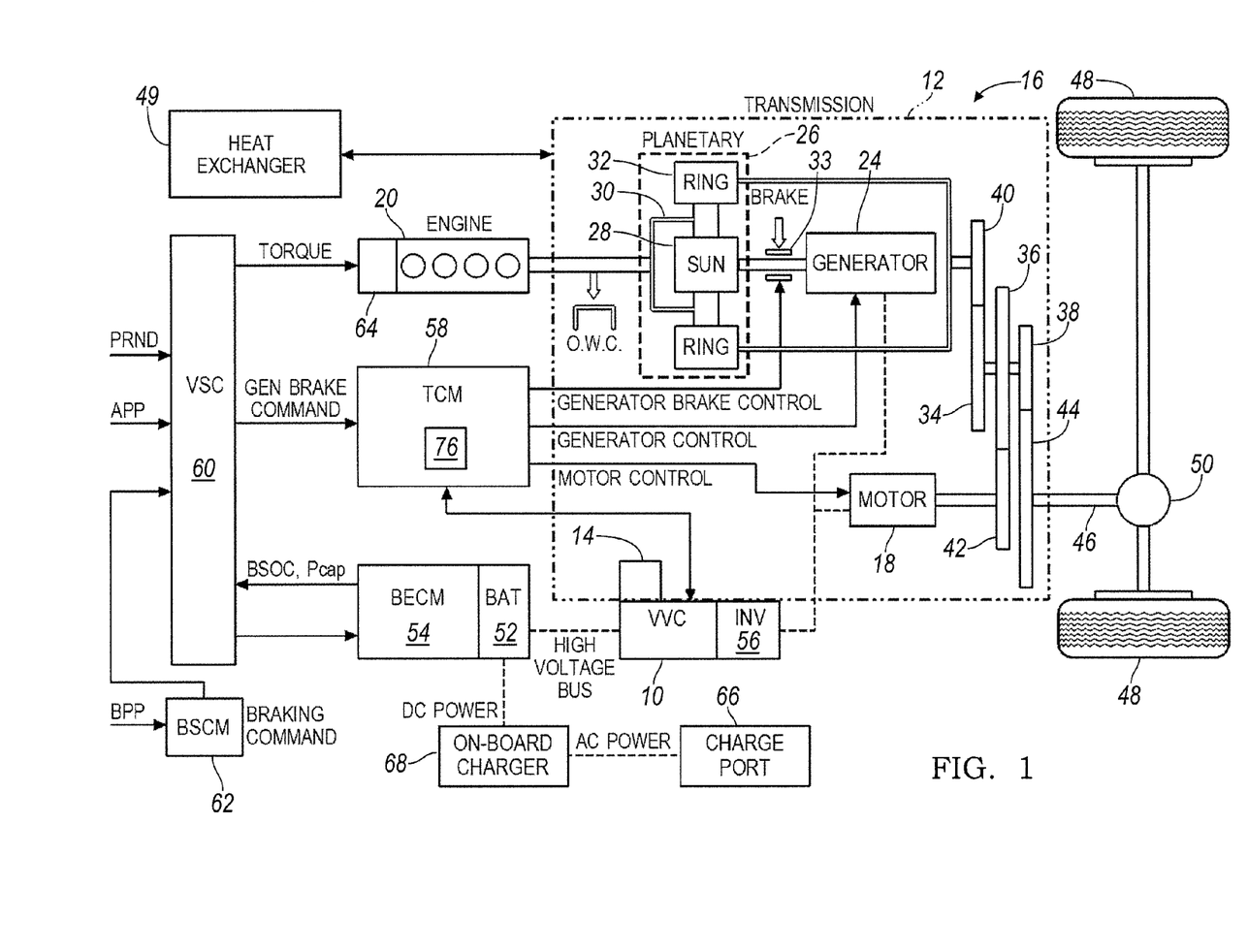
FIG. 1 is a schematic diagram of a vehicle.

Referring to FIG. 1, a transmission 12 is depicted within a plug-in hybrid electric vehicle (PHEV) 16, which is an electric vehicle propelled by an electric machine 18 with assistance from an internal combustion engine 20 and connectable to an external power grid. The electric machine 18 may be an AC electric motor depicted as "motor" 18 in FIG. 1. The electric machine 18 receives electrical power and provides drive torque for vehicle propulsion. The electric machine 18 also functions as a generator for converting mechanical power into electrical power through regenerative braking.

The transmission 12 may have a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12.

The transmission 12 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 includes a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48. The transmission also includes a heat exchanger or automatic transmission fluid cooler 49 for cooling the transmission fluid.

The vehicle 16 includes an energy storage device, such as a battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability to other vehicle systems and controllers.

The transmission 12 includes a DC-DC converter or variable voltage converter (VVC) 10 and an inverter 56. The VVC 10 and the inverter 56 are electrically connected between the main battery 52 and the first electric machine 18; and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the main battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 may provide a regenerative braking command to the VSC 60.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

The vehicle 16 may be configured as a plug-in hybrid electric vehicle (PHEV). The battery 52 periodically receives AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging.

Although illustrated and described in the context of a PHEV 16, it is understood that the VVC 10 may be implemented on other types of electric vehicles, such as a HEV or a BEV.

Figure 2:
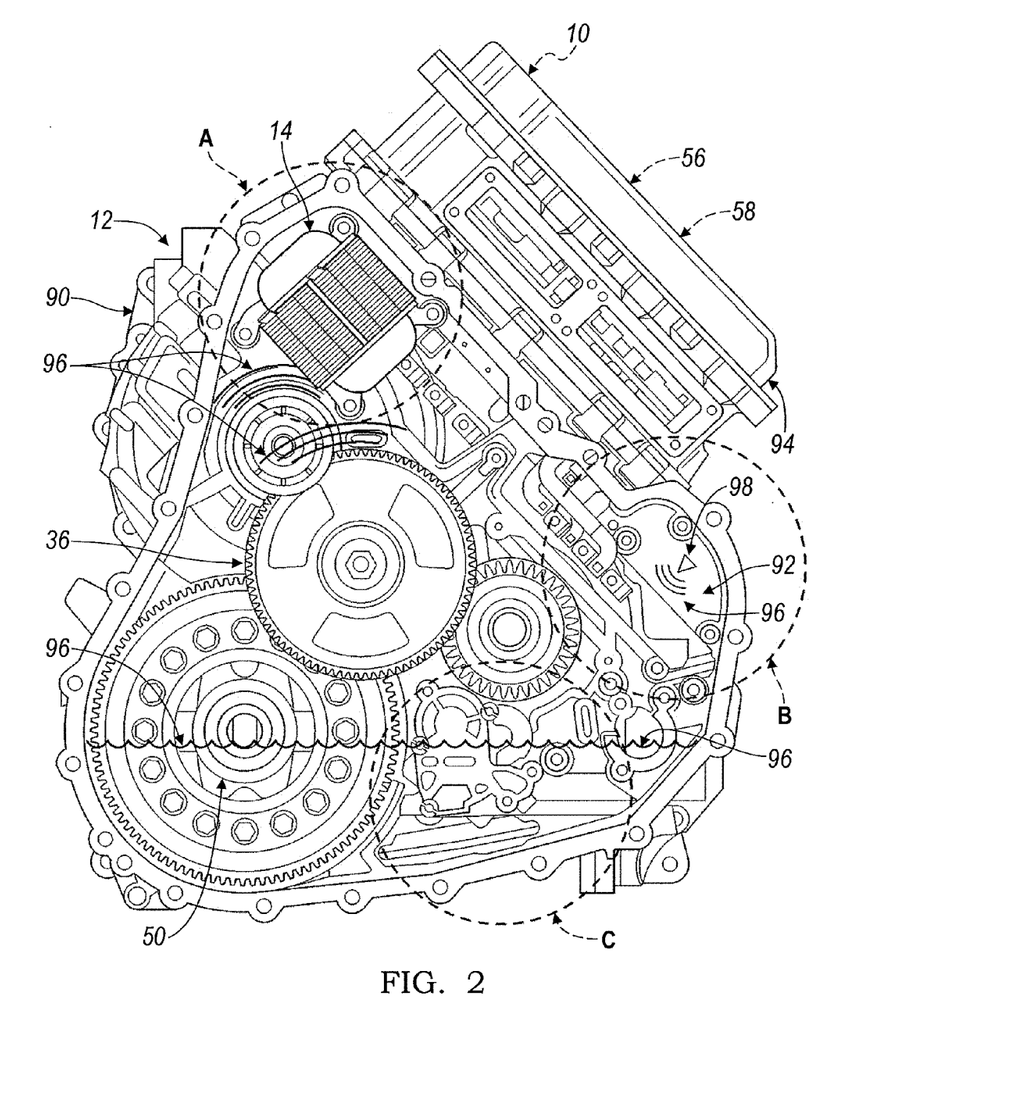
FIG. 2 is a front view of a transmission and a variable voltage converter (VVC) having an inductor assembly, and illustrating structure for supporting the inductor assembly within the transmission.

Referring to FIG. 2, a front view of the transmission 12 and the VVC 10 is shown. The transmission 12 includes a transmission housing 90, which is illustrated without a cover to show internal components. As described above, the engine 20, the motor 18 and the generator 24 include output gears that mesh with corresponding gears of the planetary gear unit 26. These mechanical connections occur within an internal chamber 92 of the transmission housing 90. A power electronics housing 94 is mounted to an external surface of the transmission 12. The inverter 56 and the TCM 58 are mounted within the power electronics housing 94.

The VVC 10 is an assembly with components that may be mounted both inside and/or outside of a transmission 12. The VVC 10 includes an inductor assembly 14. In this embodiment, the inductor assembly 14 is located within the transmission housing 90. In other embodiments the inductor assembly 14 may be located outside of the transmission. The VVC 10 also includes a number of switches and diodes (shown in FIG. 4) that are mounted in the power electronics housing 94, which is outside of the transmission 12, and are operably coupled to the inductor assembly 14. By mounting the inductor assembly 14 within the transmission 12, the exposed surface area of the inductor assembly 14 may be directly cooled by transmission fluid which allows for improved thermal performance. The transmission 12 includes additional structure for supporting the inductor assembly 14 while allowing the transmission fluid to flow through the structure to contact the exposed surface area.

The transmission 12 includes a fluid 96 such as oil or automatic transmission fluid (ATF), for lubricating and cooling the gears located within the transmission chamber 92 (e.g., the intermediate gears 34, 36, 38). The transmission chamber 92 is sealed to retain the fluid 96. The transmission 12 may also include valves, pumps and conduits (not shown) for circulating the fluid 96 through the chamber 92. A heat exchanger or ATF cooler 49 may be used to cool the fluid 96. The fluid 96 may also be used to cool the inductor assembly 14.

Rotating elements (e.g., gears and shafts) may displace or "splash" fluid 96 on other components. Such a "splash" region is referenced by letter "A" in FIG. 2 and is located in an upper portion of the chamber 92. If the inductor assembly 14 is disposed in region A, the inductor assembly 14 may be cooled by transmission fluid 96 that splashes off of the rotating elements (e.g., the second intermediate gear 36 and the differential 50) as they rotate.

The transmission 12 may include nozzles 98 for directly spraying transmission fluid 96 on components within the housing 90, according to one or more embodiments. Such a "spray" region is referenced by letter "B" in FIG. 2 and is located in an intermediate portion of the chamber 92. The inductor assembly 14 may be mounted within region B and cooled by transmission fluid 96 that sprays from the nozzle 98. The inductor assembly 14 may also receive transmission fluid 96 that splashes off of proximate rotating elements (e.g., the planetary gear unit 26). Other embodiments of the transmission 12 contemplate multiple nozzles and nozzles mounted in other locations of the chamber 92 (e.g., a nozzle mounted in region A).

Further, the transmission fluid 96 accumulates within a lower portion, also known as a reservoir or sump 99 of the chamber 92. Such an "immersion" region is referenced by letter "C" in FIG. 2 and is located in a lower portion 99 of the chamber 92. The inductor assembly 14 may be mounted within region C and immersed in the transmission fluid 96.

Figure 3:
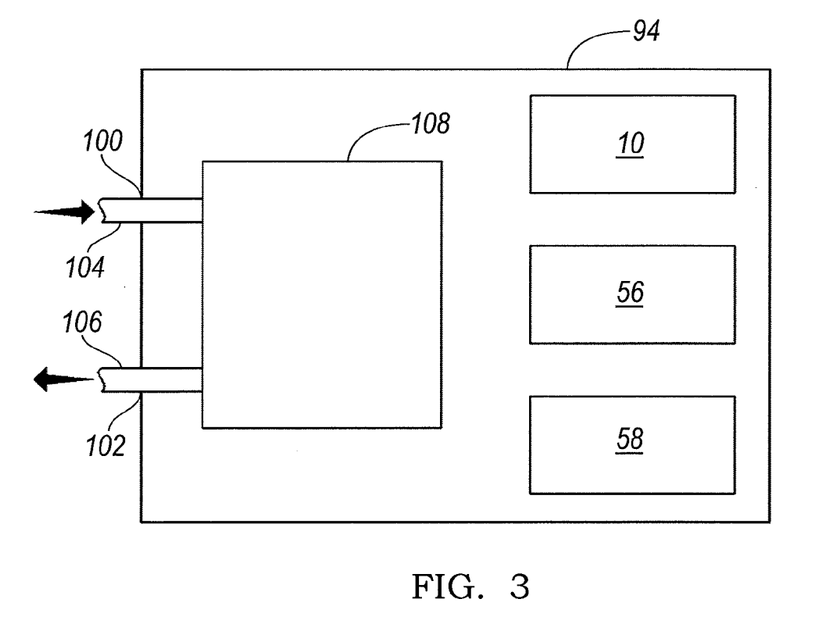
FIG. 3 is a schematic diagram of a power electronics housing.

Referring to FIG. 3, a power electronics housing 94 is shown in an alternative embodiment. In this embodiment, the VVC 10, the inverter 56, the TCM 58, and the inductor assembly 108 are all disposed within the housing 94. The housing 94 includes a first aperture 100 and a second aperture 102. An inlet fluid line 104 is received through the first aperture 100 and provides fluid to the inductor assembly 108. An outlet fluid line 106 is received through the second aperture 102 and provides a return for the fluid. The fluid is circulated through the inductor assembly 108 to cool the inductor assembly 108. The inductor assembly 108 is sealed to prevent fluid from damaging the other electrical components inside the housing 94. The inlet and outlet fluid lines 104, 106 may be connected with the transmission plumbing or may be part of an independent fluid loop. If an independent fluid loop is used, additional pumps and heat exchangers may need to be provided.

Alternatively, the inductor 108 may be disposed in its own dedicated housing. The dedicated housing may also contain splash, spray and submersion cooling zones similar to the zones A, B and C in the transmission 12 as described above.

Figure 4:
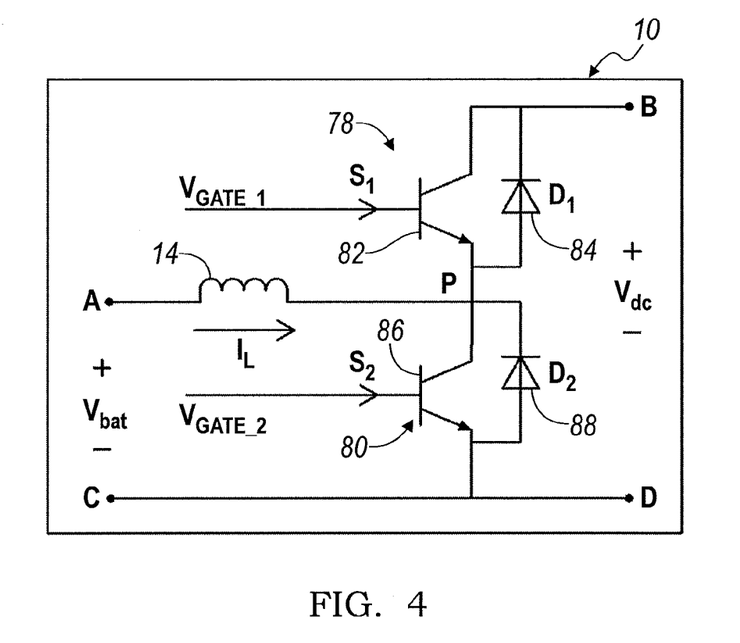
FIG. 4 is a circuit diagram of the VVC of FIG. 2.

Referring to FIG. 4, the VVC 10 includes a first switching unit 78 and a second switching unit 80 for boosting the input voltage ($V_{bat}$) to provide output voltage ($V_{dc}$). The first switching unit 78 includes a first transistor 82 connected in parallel to a first diode 84, but with their polarities switched (anti-parallel). The second switching unit 80 includes a second transistor 86 connected anti-parallel to a second diode 88. Each transistor 82, 86 may be any type of controllable switch (e.g., an insulated gate bipolar transistor (IGBT) or field-effect transistor (FET)). Additionally, each transistor 82, 86 is individually controlled by the TCM 58. The inductor assembly 14 is depicted as an input inductor that is connected in series between the main battery 52 and the switching units 78, 80. The inductor 14 generates magnetic flux when a current is supplied. When the current flowing through the inductor 14 changes, a time-varying magnetic field is created, and a voltage is induced. The VVC 10 may also include different circuit configurations (e.g., more than two switches).

Figure 5:
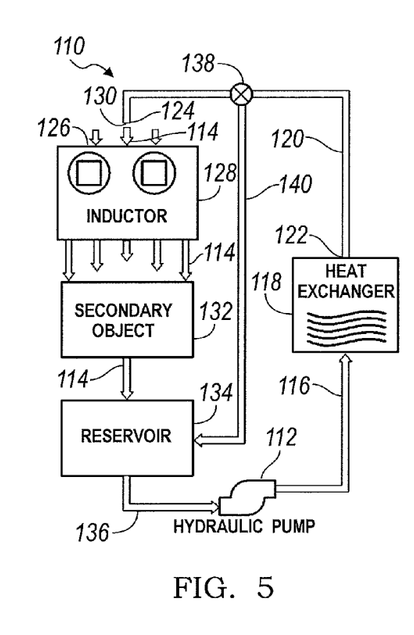
FIG. 5 is a schematic diagram of an open loop inductor cooling system.

Referring to FIG. 5, a schematic of an open loop inductor cooling system 110 is depicted. The system 110 includes a hydraulic pump 112 for circulating a dielectric fluid 114 such as ATF. A first supply line 116 is attached to the pump 112 and connects the pump 112 with a heat exchanger or ATF cooler 118. A second supply line 120 is connected to the heat exchanger 118 at a first end 122. A second end 124 of the second supply line 120 is positioned proximate a top 126 of the inductor assembly 128. In operation, the fluid 114 is pumped out of at least one opening 130 in the second end 124 and drips onto the top 126 of the inductor assembly 128.

The top 126 is either open or contains openings, such as holes or slots, for allowing the fluid 114 to drip inside of the assembly 128 and make contact with the internal components of the inductor assembly 128. The fluid 114 then flows across the inductor assembly 128 due to gravity. The inductor assembly 128 is cooled as the fluid 114 flows around and through the inductor assembly 128. An optional secondary object 132 may be disposed under the inductor assembly 114. The fluid 114 drips from the inductor assembly 128 onto the secondary object 132 to cool the secondary object 132. The secondary object 132 may be a component inside the transmission 12 or may be any other component that is contained within the housing that contains the inductor assembly 128 and requires cooling. Fluid 114 that drips off of the inductor 128 and/or the secondary cooling object 132 is collected in a reservoir or sump 134. A pickup tube 136 is provided in the sump 134 and connects with the pump 112 to supply fluid 114 to the pump 112 for recirculation though the system 110.

At least one valve assembly 138 may be provided in one or more of the fluid lines. The valve assembly 138 is used to control the fluid flow. The valve assembly may include an actuator and a valve. The actuator may be in electrical communication with one or more controllers and configured to open and close the valve according to signals sent by the one or more controllers. A bypass line 140 may be provided to supply fluid 114 to the reservoir 134 or secondary object 132 when the valve assembly 138 is at least partially closed.

The open loop inductor cooling system 110 may be integrated into the transmission plumbing or may be an independent fluid loop. Integrating the system 110 into the transmission plumbing may provide cost savings by reducing the number of parts required due to part sharing. For example, integrating system 110 with the transmission 12 allows the system 110 to use the ATF, transmission pump, heat exchanger and reservoir to reduce redundant parts.

Figure 6:
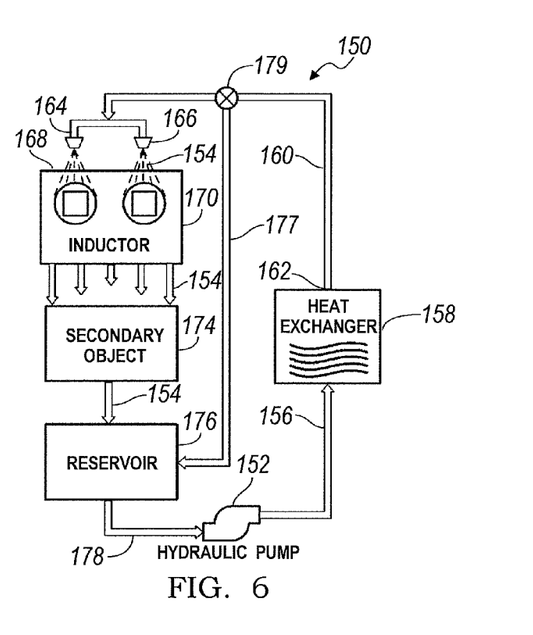
FIG. 6 is a schematic diagram of a spray inductor cooling system.

Referring to FIG. 6, a schematic view of a spray inductor cooling system 150 is shown. The system 150 includes a hydraulic pump 152 for circulating a fluid 154. A first supply line 156 is attached to the pump 152 and connects the pump 152 with a heat exchanger or ATF cooler 158. A second supply line 160 is connected to the heat exchanger 158 at a first end 162. A second end 164 of the supply line 160 is positioned proximate a top 168 of the inductor assembly 170. At least one nozzle 166 is attached to the second end 164. In operation, the fluid 154 is pumped out of the at least one nozzle and sprayed on to the top 168 of the inductor assembly 170. The top 168 is either open or contains openings, such as holes or slots, for allowing the fluid 154 to drip inside of the assembly 170 and make contact with the internal components of the inductor assembly 168. The droplets of fluid accumulate on the inductor assembly 170 and drip across the inductor assembly 170 due to gravity. The inductor assembly 170 is cooled as the fluid 154 flows around and through the inductor assembly 170. An optional secondary object 174 may be disposed under the inductor assembly 170. The fluid 154 drips from the inductor assembly 128 onto the secondary object 174 to cool the secondary object 174. The secondary object 174 may be a component inside the transmission 12 or may be any other component that is contained within the housing that contains the inductor assembly 170. Fluid 154 that drips off of the inductor 170 and/or the secondary cooling object 174 is collected in a reservoir or sump 176. A pickup tube 178 is provided in the sump 176 and connects with the pump 152 to supply fluid 154 to the pump 152 for recirculation though the system 150.

At least one valve assembly 179 may be provided in one or more of the fluid lines. The valve assembly 179 may be similar to valve assembly 138. The valve assembly 179 is used to control the fluid flow. The valve 179 assembly may be electrically connected to a controller for opening and closing the valve, as similarly described above with respect to valve assembly 138. A bypass line 177 may be provided to supply fluid 154 to the reservoir 176 or secondary object 174 when the valve assembly 179 is at least partially closed.

The spray inductor cooling system 150, like the cooling system 110, may be integrated into the transmission plumbing or may be an independent fluid loop. Integrating the system 150 into the transmission plumbing may provide cost savings by reducing the number of parts required due to part sharing.

Alternatively, the spray nozzles 166 many spray the fluid 154 on a rotating object, such as one of the transmission gears. The transmission gears may cool the inductor assembly 170 by splashing the fluid 154 on the inductor assembly 170.

Figure 7:
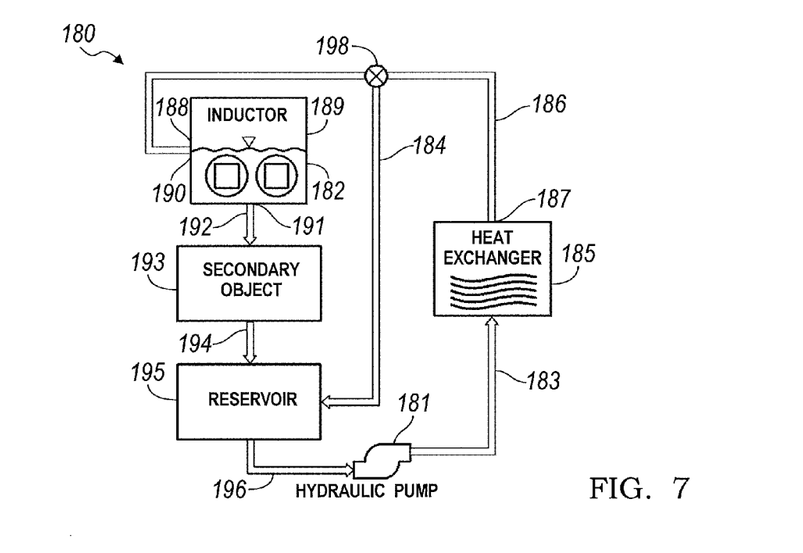
FIG. 7 is a schematic diagram of a closed loop inductor cooling system.

Referring to FIG. 7, a schematic view of a closed loop inductor cooling system 180 is shown. The system 180 includes a hydraulic pump 181 for circulating a fluid 182. A first supply line 183 is attached to the pump 181 and connects the pump 181 with a heat exchanger or ATF cooler 185. A second supply line 186 is connected to the heat exchanger 185 at a first end 187. A second end 188 of the second supply line 186 is coupled to the inductor assembly 189. The inductor assembly 189 includes an inlet aperture 190 for receiving fluid 182 from the second supply line 186 into the inductor assembly 189. An outlet aperture 191 is provided in the inductor assembly 189. An intermediate line 192 is coupled to the inductor assembly 189 at the outlet aperture 191 to receive fluid 182 from the outlet aperture 191. The inductor assembly 189 may be sealed to prevent fluid leakage. The inductor assembly 189 is cooled as the fluid 182 circulates through the inductor assembly 189. The intermediate line 192 may be coupled with an optional secondary object 193. The secondary object 193 may be the transmission 12 or any other component that needs cooling. A return line 194 may connect the secondary object to a reservoir 195. If the secondary object is the transmission 12, the return line may be omitted and the fluid 182 may be allowed to freely flow within the transmission and gravity drain into the reservoir or sump 195. A pickup tube 196 is provided in the reservoir 195 and connects with the pump 182 to supply fluid 182 to the pump 181 for recirculation through the system 180.

At least one valve assembly 198 may be provided in one or more of the fluid lines. The valve assembly 198 is used to control the fluid flow. The valve assembly 198 may be the same as valve assemblies 138 and/or 179. A bypass line 184 may be provided to supply fluid 182 to the reservoir 195 or the secondary object 193 when the valve assembly 138 is at least partially closed.

The closed loop inductor cooling system 180 is a self-contained system and has the advantage of allowing the inductor assembly 189 to be placed within oil free housings or compartments. For example the inductor assembly 189 may be placed within the power electronics housing 94. Similar to the open loop cooling system 110 and the spray cooling system 150, the closed loop system 180 may be integrated into the transmission plumbing or may be an independent coolant loop.

Figure 8:
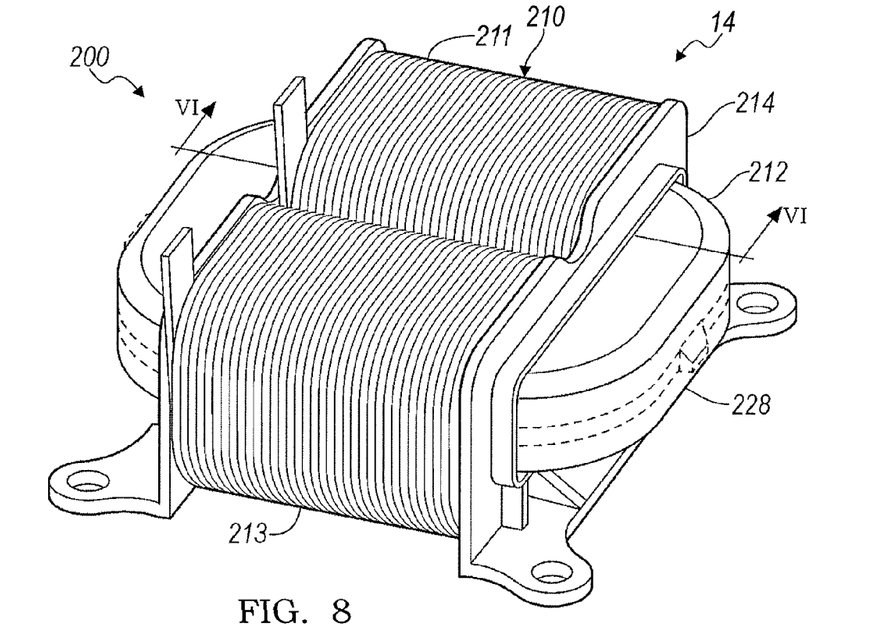
FIG. 8 is an enlarged front perspective view of an inductor assembly including support structure according to one or more embodiments.

FIG. 8 illustrates the inductor assembly 200 according to one or more embodiments. The inductor assembly may be placed in various locations on the vehicle such as within the transmission housing 90, the power electronics housing 94 or any other suitable location. The inductor assembly 14 includes a conductor 210 that is formed into two adjacent tubular coils, a core 212 and an insulator 214. The inductor assembly 200 includes the insulator 214, which is formed as a two-piece bracket and supports the conductor 210 and the core 212. Additionally, the insulator 214 physically separates the conductor 210 from the core 212 and is formed of an electrically insulating polymeric material, such as Polyphenylene sulfide (PPS).

Figure 9:
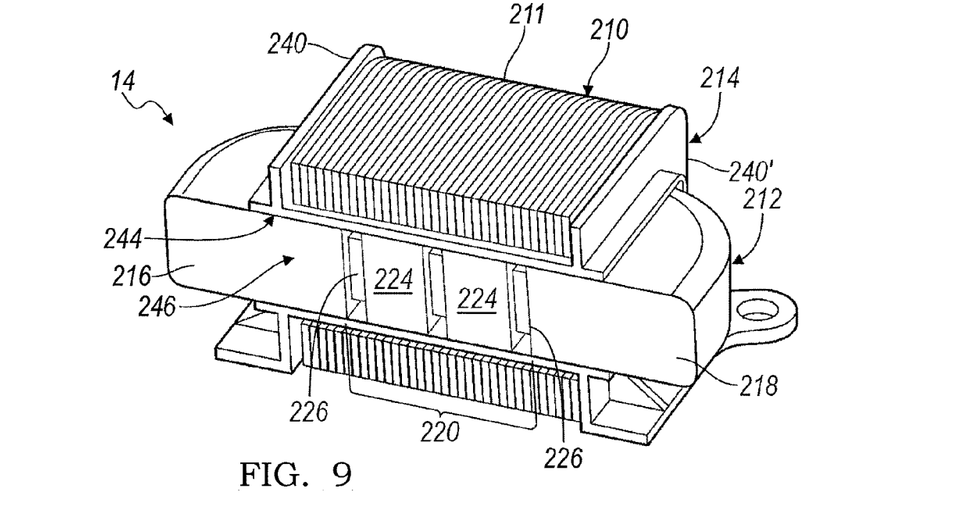
FIG. 9 is a section view of the inductor assembly of FIG. 8 taken along section line VI-VI.
Figure 10:
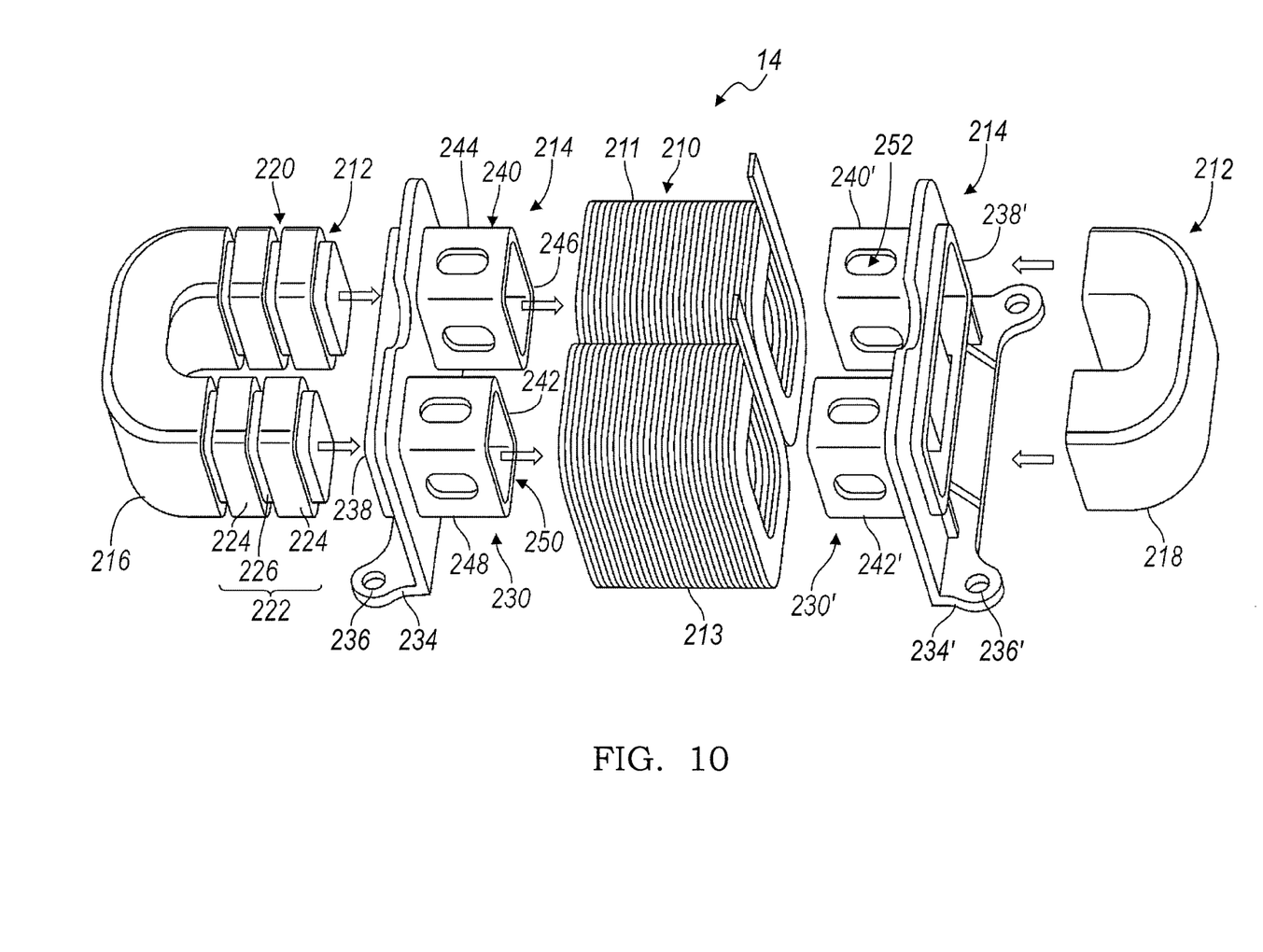
FIG. 10 is an exploded view of the inductor assembly of FIG. 8.

Referring to FIGS. 8-10, the conductor 210 is formed of a conductive material, such as copper or aluminum, and wound into two adjacent helical coils, a first coil 211 and a second coil 213. The coils may be formed using a rectangular (or flat) type conductive wire by an edgewise process. Input and output leads extend from the conductor 210 and connect to other components.

The core 212 may be formed in a dual "C" configuration. The core 212 includes a first end 216 and a second end 218 that are each formed in a curved shape. The core 212 also includes a first leg 220 and a second leg 222 for interconnecting the first end 216 to the second end 218 to collectively form a ring shaped core 212. Each leg 220, 222 includes a plurality of core elements 224 that are spaced apart to define air gaps. (FIG. 9). The core 212 may be formed of a magnetic material, such as an iron silicon alloy powder. Ceramic spacers 226 may be placed between the core elements 224 to maintain the air gaps. An adhesive may be applied to the core 212 to maintain the position of the ends 216, 218 and the legs 220, 222 including the core elements 224 and the spacers 226. Alternatively, a strap 228, as shown in phantom view in FIG. 8, may be secured about an outer circumference of the core 212 to maintain the position of the ends 216, 218 and legs 220, 222.

Referring to FIG. 10, the insulator 214 may be formed as a bobbin structure with a first half portion 230 and a second half portion 230' that are generally symmetrical to each other. Each half portion 230, 230' includes a base 234, 234' for attachment of the assembly 14. The base 234, 234' includes apertures 236, 236' for receiving fasteners (not shown) for mounting the inductor assembly 14 to a supporting structure such as a transmission or other housing. A support 238, 238' extends transversely from the base 234, 234'. A pair of spools, including a first spool 240, and a second spool 242, extend from the support 238 of the first half portion 230, to engage a corresponding first spool 240' and a corresponding second spool 242' that extend from the support 238' of the second half portion 230'. In one embodiment, the first spools 240, 240' are coaxially aligned along a first longitudinal axis (not shown), and the second spools 242, 242' are coaxially aligned along a second longitudinal axis (not shown) that is parallel to the first longitudinal axis. The spools 240, 240', 242, 242' are each formed in a tubular shape with a generally square shaped cross section.

As shown in FIG. 10, the insulator 214 supports the conductor 210 and the core 212. The first spools 240, 240' engage each other to collectively provide an external surface 244 for supporting the first coil 211. The first spools 240, 240' also define a cavity 246 for receiving the first leg 220 of the core 212. Similarly, the second spools 242, 242' engage each other to collectively provide an external surface 248 for supporting the second coil 213, and define a cavity 250 for receiving the second leg 222 of the core 212. According to the illustrated embodiment, the spools 240, 240', 242, 242' include a plurality of holes 252 for facilitating heat transfer from the legs 220, 222 by allowing the fluid 96 to easily pass through the spools 240, 240', 242, 242'.

Other embodiments of the insulator 214 include nonsymmetrical half portions (not shown). For example, the spools may extend from one of the half portions and are received by the support of the other half portion (not shown).

Figure 11:
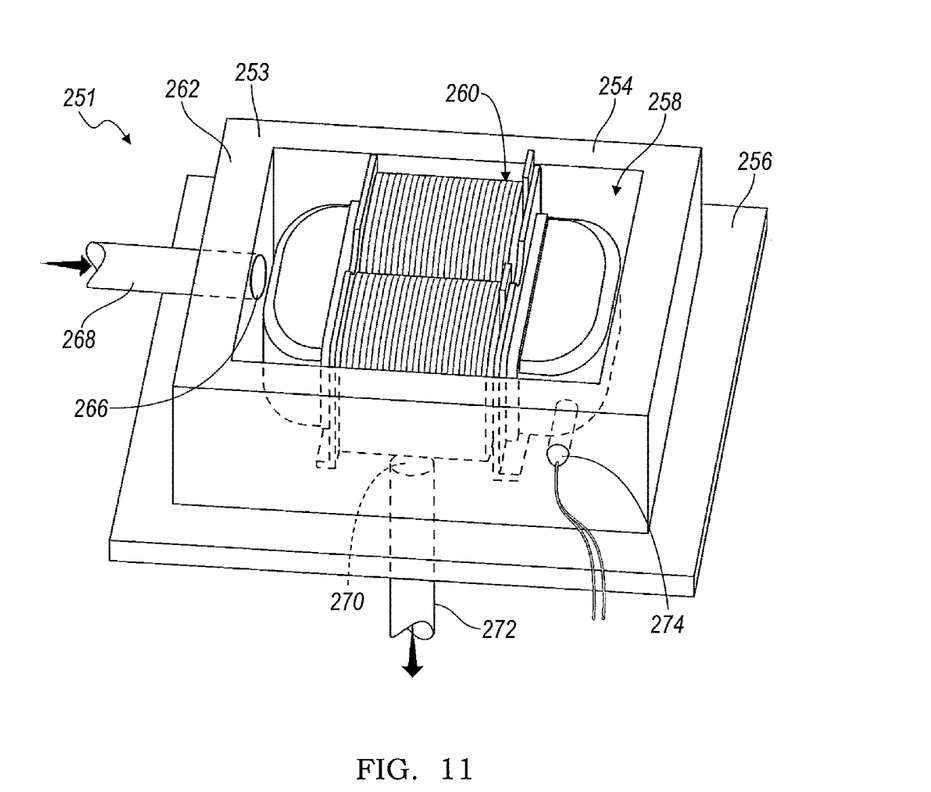
FIG. 11 illustrates an inductor assembly for the closed loop inductor cooling system.

Referring to FIG. 11, an alternative inductor assembly 251 is shown for use with the closed loop inductor cooling system 180. The inductor assembly 251 includes a housing 253. The housing 253 includes sidewalls 254 and a bottom wall 256 cooperating to define an enclosure 258. The inductor 260 is disposed within the enclosure 258. A potting compound may be provided to partially fill the enclosure 258. Holes may be provided through the potting compound to facilitate circulation of the fluid. A cover (removed and not shown) is configured to be disposed on a top portion 262 of the sidewalls 254. The cover may be sealed onto the housing 253 with a gasket or other sealant to form a fluid tight enclosure 258. The sidewall 254 includes an aperture 266. An inlet fluid line 268 is coupled to the aperture 266 to allow pumped fluid into the enclosure 258. The bottom wall 256 also includes an aperture 270. An outlet fluid line 272 is coupled to the aperture 270 to allow fluid to exit the enclosure 258. The outlet fluid line 272 and aperture 270 may be provided in the sidewall 254 instead of in the bottom wall 256. As the fluid 96 is circulated through the enclosure 258 the inductor 260 is cooled. A temperature sensor 274 may be provided to measure the temperature of the inductor 260 and the temperature of the fluid. If potting compound is provided, the temperature sensor 274 may be embedded in the potting compound.

The fluid may be ATF supplied from the transmission 12. Alternatively, the fluid may be another suitable oil and may be supplied by an independent fluid loop. In this case, an additional pump, reservoir and heat exchanger may be provided for the independent fluid loop. The inductor assembly 251 is a sealed unit which does not have any fluid leakage. Thus, the inductor assembly 251 has the advantage of allowing the inductor assembly 189 to be placed within oil free housings or compartments.

Figure 12:
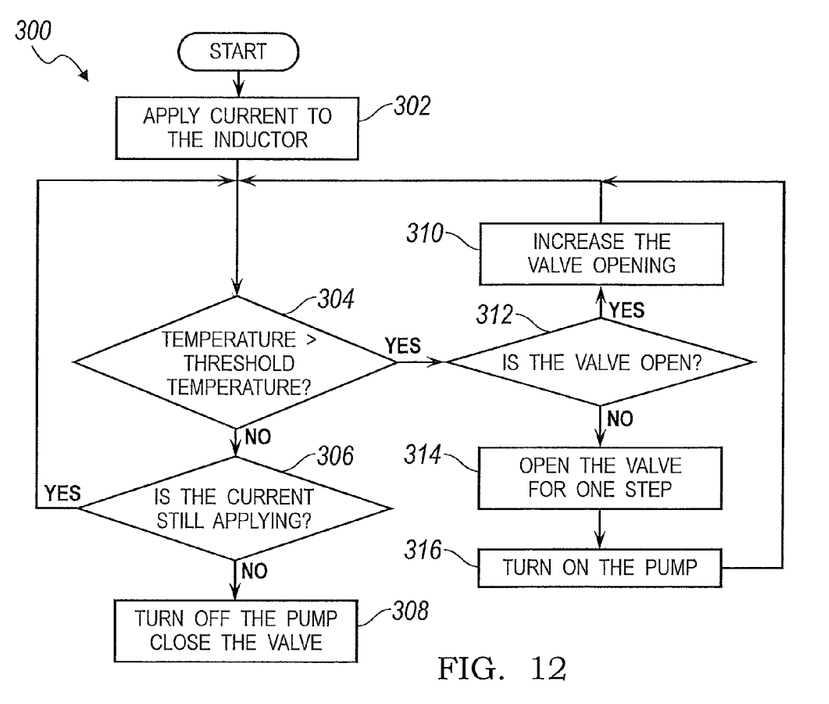
FIG. 12 is a flow chart for controlling the operation of an inductor cooling system.

Referring to FIG. 12, a flow chart 300 is shown for controlling any of the above described inductor cooling systems. The flow chart is implemented using software code contained within one or more of the controllers such as the VSC 60, TCM 58, and/or ECM 64. At operation 302, current is applied to the inductor. At operation 304, the controller determines if the inductor temperature is greater than a threshold temperature. The controller may determine the inductor temperature by receiving a temperature signal from an inductor temperature sensor indicative of the inductor temperature. The measured inductor temperature can then be compared to a threshold temperature. The threshold temperature may be stored in a look up table or other memory within the controller.

At operation 306, it is determined whether current is still being applied to the inductor. If current is still being applied, the loop continues to run and operation 304 is repeated as necessary. If current is not still being applied, then the controller signals the pump to turn off and the valve to close at operation 308.

If the inductor temperature is greater than the threshold temperature, the system proceeds to operation 312. At operation 312, the controller determines the position of the valve. The valve position may be determined by having the controller receiving a signal from the valve indicative of the valve position. If at operation 312, it is determined that the valve is closed, then the valve is opened one step at operation 314 and the pump is activated at operation 316. If it is determined at operation 312 that the valve is open, then at operation 310 the valve opening is increased. The controller will continue to monitor the inductor temperature and further increase the valve opening, up to a maximum, so long as the inductor temperature is above the threshold temperature.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
    a housing defining a chamber;
    an inductor assembly including a coil having exterior surface portions exposed to an interior of the chamber; and
    at least one gear disposed within the housing and configured to rotate relative to the housing and splash fluid onto the exterior surface portions to cool the inductor assembly.

2. The transmission of claim 1 further comprising at least one nozzle disposed within the housing proximate to the inductor assembly and configured to spray fluid onto the exterior surface portions to further facilitate cooling of the inductor assembly.

3. The transmission of claim 1 further comprising:
    a pump; and
    at least one fluid line in fluid communication with the pump and configured to direct fluid to the exterior surface portions.

4. The transmission of claim 3 wherein the at least one fluid line further comprises at least one nozzle oriented toward the coil.

5. A vehicle comprising:
    a transmission including gears lubricated by transmission fluid; and
    a variable voltage converter (VVC) including an inductor arranged such that the transmission fluid contacts the inductor to cool the inductor.

6. The vehicle of claim 5 further comprising a power electronics housing attached to the transmission, wherein the VVC is disposed within the power electronics housing.

7. The vehicle of claim 6 wherein the inductor is disposed within the power electronics housing.

8. The vehicle of claim 7 wherein the VVC further comprises an inductor housing defining a chamber containing the transmission fluid, wherein the inductor is disposed within the chamber and is in contact with the transmission fluid.

9. The vehicle of claim 8 wherein the inductor housing further comprises:
    an inlet aperture configured to receive transmission fluid into the chamber; and
    an outlet aperture configured to drain transmission fluid out of the chamber such that in operation, transmission fluid is circulated through the chamber to cool the inductor.

10. The vehicle of claim 8 wherein the transmission further comprises a pump and wherein the pump is configured to supply the transmission fluid into the chamber.

11. The vehicle of claim 6 wherein the inductor is disposed within the transmission.

12. The vehicle of claim 5 further comprising a fluid line configured to supply the transmission fluid to the inductor.

13. The vehicle of claim 12 further comprising a nozzle attached to the fluid line and configured to spray the transmission fluid onto the inductor.

14. The vehicle of claim 12 further comprising a valve assembly configured to control supply of the transmission fluid to the inductor.

15. The vehicle of claim 14 further comprising a controller configured to:
    receive a signal indicative of a temperature of the inductor; and
    send a signal to the valve assembly instructing the valve assembly to open if the temperature of the inductor is greater than a threshold temperature.

16. A vehicle electrical power system comprising:
    a variable voltage converter (VVC) including an inductor assembly having a housing defining a chamber containing dielectric fluid, and an inductor disposed within the chamber and in contact with the fluid; and
    a pump configured to circulate the dielectric fluid to cool the inductor.

17. The electrical power system of claim 16 wherein the dielectric fluid is a transmission fluid configured to be supplied from a transmission.

18. The electrical power system of claim 16 further comprising a power electronics housing, wherein the VVC is disposed within the power electronics housing.

19. The electrical power system of claim 18 further comprising a controller disposed within the power electronics housing and configured to:
    receive a signal indicative of a temperature of the inductor; and
    send a signal to increase circulation of the dielectric fluid if the temperature of the inductor is greater than a threshold temperature.

* * * * *